United States Patent
Plesniak (10) Patent No.: US 11,644,084 B2
(45) Date of Patent: May 9, 2023

(54) FORCE SENSING SLEW DRIVE

(71) Applicant: Kinematics, LLC, Phoenix, AZ (US)

(72) Inventor: Adam P. Plesniak, Huntington Beach, CA (US)

(73) Assignee: KINEMATICS, LLC, Phoenix, AZ (US)

( * ) Notice: Subject to any disclaimer, the term of this patent is extended or adjusted under 35 U.S.C. 154(b) by 410 days.

(21) Appl. No.: 16/585,146

(22) Filed: Sep. 27, 2019

(65) Prior Publication Data

US 2020/0109767 A1    Apr. 9, 2020

Related U.S. Application Data (60) Provisional application No. 62/741,468, filed on Oct. 4, 2018.

(51) Int. Cl.
| | |
|---|---|
| *F16H 1/16* | (2006.01) |
| *G01L 1/24* | (2006.01) |
| *G01L 3/02* | (2006.01) |

(52) U.S. Cl.
CPC ............... *F16H 1/16* (2013.01); *G01L 1/24* (2013.01); *G01L 3/02* (2013.01)

(58) Field of Classification Search
CPC ... F16H 1/16; F16H 57/01; G01L 1/24; G01L 3/02; G01L 5/12; G01L 1/2231
See application file for complete search history.

(56) References Cited

U.S. PATENT DOCUMENTS

| | | | |
|---|---|---|---|
| 3,799,108 A * | 3/1974 | Mosow | ........... G01L 1/24 411/548 |
| 6,289,749 B1 | 9/2001 | Sanders | |

(Continued)

FOREIGN PATENT DOCUMENTS

| | | | | |
|---|---|---|---|---|
| DE | 4118611 A1 | 12/1992 | | |
| EP | 2735766 A1 * | 5/2014 | ............... | F16H 1/16 |
| WO | WO-2020072289 A1 | 4/2020 | | |

OTHER PUBLICATIONS

European search report and opinion dated May 20, 2022 for EP Application No. 19869413.5.

(Continued)

*Primary Examiner* — Thomas C Diaz (74) *Attorney, Agent, or Firm* — Wilson Sonsini Goodrich & Rosati (57) ABSTRACT

A sensor is used in measuring the torque applied to a slew drive. The slew drive includes a worm gear and a worm wheel and the sensor is coupled with a securing device that is used to secure the worm gear to the slew drive housing. The sensor generates a signal which is indicative of the torque on the worm wheel. The worm gear is secured to the slew drive housing by a first bearing and a second bearing. Two end plates and eight bolts are also used to further secure the worm gear and the bearings to the slew drive housing. By tightening the bolts, a compressive force is applied on the worm gear through the bearings. The applied torque on the worm wheel causes an axial force on the worm gear. The axial force is transmitted through the worm gear, the bearings, the end plates, and the bolts. One or more sensors can be embedded in one or more of the end plates or the bolts to measure the strain, in the end plates or the bolts, due to the axial force. A control device receives the signal from the sensor and stores, analyses, and/or communicates the signal.

22 Claims, 6 Drawing Sheets

(56) References Cited

U.S. PATENT DOCUMENTS

| | | |
|---|---|---|
| 6,988,582 B2 | 1/2006 | Kitami et al. |
| 7,228,933 B2 | 6/2007 | Joushita |
| 7,523,805 B2 | 4/2009 | Imagaki et al. |
| 7,806,016 B2 | 10/2010 | Shimizu et al. |
| 7,971,490 B2 * | 7/2011 | Fleury .................. G01L 5/0061 73/781 |
| 8,459,402 B2 | 6/2013 | Hamakita et al. |
| 9,182,030 B2 | 11/2015 | Morgan |
| 9,523,805 B2 | 12/2016 | Davis |
| 9,816,600 B2 | 11/2017 | Morgan |
| 10,183,691 B2 | 1/2019 | Segawa |
| 10,498,193 B2 | 12/2019 | Henderson et al. |
| 2005/0072620 A1 | 4/2005 | Joushita |
| 2010/0052482 A1 | 3/2010 | Kuo |
| 2013/0008270 A1 | 1/2013 | Giovannone et al. |
| 2013/0337958 A1 | 12/2013 | Scalf et al. |
| 2015/0082923 A1 | 3/2015 | Morgan |
| 2015/0226542 A1 * | 8/2015 | Sakashita ............ G01B 11/168 356/33 |
| 2015/0300479 A1 * | 10/2015 | Frank ...................... F16H 57/01 324/207.2 |
| 2016/0200420 A1 | 7/2016 | McKenna et al. |
| 2019/0101206 A1 | 4/2019 | Plesniak et al. |

OTHER PUBLICATIONS

International search report with written opinion dated Dec. 6, 2019 for PCT/US2019/053377.

* cited by examiner

FORCE SENSING SLEW DRIVE

CROSS REFERENCE TO RELATED APPLICATIONS

The present patent application is a formalization of a previously filed co-pending provisional patent application entitled "Force Sensing Slew Drive," filed on 2018 Oct. 4, as U.S. patent application Ser. No. 62/741,468 by the inventor(s) named in this application. This patent application claims the benefit of the filing date of the cited provisional patent application according to the statutes and rules governing provisional patent applications, particularly 35 USC § 119 and 37 CFR § 1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention relates to a slew drive which uses one or more sensors to determine the applied torque on the slew drive. In particular, a slew drive which includes a housing, a worm gear, a worm wheel, and a securing device, can be instrumented with one or more sensors to sense the applied torque on the worm wheel. Each sensor generates a signal which is indicative of the torque. A control device can be used to receive the signal from the sensor and selectively store, analyze, and/or communicate the signal.

BACKGROUND

A slew drive is a mechanism which is commonly used to rotate an external unit by applying a torque at a relatively slow rotational speed. Slew drives are used in various applications including solar trackers, wind turbines, and heavy vehicles. A slew drive includes a worm gear and a worm wheel. The worm wheel and the worm gear are housed within a slew drive housing. The housing includes two ends where two bearings, such as two tapered roller bearings, are positioned. The worm gear is secured to the housing via the two bearings. A central threaded section of the worm gear engages the teeth of the worm wheel. The worm wheel is coupled with the external unit and applies the torque to rotate it at the aforementioned rotational speed. The slew drive further utilizes two end plates and a number of bolts, typically 4 on each side, to further secure the worm gear and the tapered roller bearings to the slew drive housing. This is accomplished by tightening the bolts on each side which exert an axial compressive force on the worm gear. The bolts also experience an equal force but in the opposite direction. Hence, a tensile force is developed within each bolt.

It would be desirable to measure the torque on the worm wheel as a function of time and utilize the data for real time monitoring and control and/or future processing. The applied torque on the external unit is experienced by the worm wheel but in the opposite direction. The torque on the worm wheel is manifested as an axial force in the worm gear. The present invention uses one or more sensors to measure the torque by sensing the axial force experienced by the worm gear. Specifically, the sensor may be embedded in a securing device, such as an end plate or a bolt. The sensor is configured to sense a load on the securing device in response to a torque on the worm wheel and to generate a signal indicative of the torque on the worm wheel. A control device is used to receive the signal and to store, analyze, and/or communicate the signal to the outside world.

SUMMARY

In one aspect, a slew drive is disclosed wherein the slew drive comprises a slew drive housing, a worm gear comprising a central threaded section, a worm wheel comprising worm-wheel teeth, operative to engage the central threaded section of the worm gear, a securing device, operative to secure the worm gear to the slew drive housing, and a sensor coupled with the securing device, wherein the sensor is configured to sense a load on the securing device in response to a torque on the worm wheel and generate a signal indicative of the torque on the worm wheel.

Preferably, the securing device is one of a distal plate, a bolt, a threaded plug, and a retaining ring.

Preferably, the sensor is one of an electrical strain gauge and an optical strain gauge.

Preferably, the slew drive further comprises a control device coupled with the sensor, wherein the control device is configured to receive the signal from the sensor and at least one of store, analyze, and communicate the signal.

Preferably, the control device comprises a processor, including a programming code stored on a storage device of said processor and operable on the processor, wherein the processor further comprises an analog to digital convertor (ADC), said ADC operative to digitize the signal at a sampling rate of the ADC and generate a digitized signal, and a communication module operative to at least one of receive and transmit radio waves, and wherein the processor is configured to at least one of store, analyze, and communicate at least one of the signal and the digitized signal.

Preferably, the processor is configured to transmit the at least one of the signal and the digitized signal, via the communication module, to a remote computer system.

Preferably, the processor is configured to construct a histogram of the digitized signal.

Preferably, the processor is configured to compute an average value of the digitized signal, indicative of an average value of the torque on the worm wheel, over a predetermined time period.

Preferably, the processor is configured to transmit the average value, via the communication module, to a motor controller.

Preferably, the processor is configured to compute a frequency spectrum of the digitized signal, indicative of a time varying function of the torque on the worm wheel.

Preferably, the processor is configured to transmit the frequency spectrum, via the communication module, to a motor controller.

Preferably, the communication module comprises at least one of a wired communication module and wireless communication module.

In another aspect, a method of monitoring and controlling a slew drive is disclosed wherein the method comprises providing a slew drive housing, providing a worm gear comprising a central threaded section, providing a worm wheel comprising worm-wheel teeth, operative to engage the central threaded section of the worm gear, providing a securing device, operative to secure the worm gear to the slew drive housing, and providing a sensor coupled with the securing device, wherein the sensor is configured to sense a load on the securing device in response to a torque on the worm wheel and generate a signal indicative of the torque on the worm wheel.

Preferably, the method further comprises providing a control device coupled with the sensor, wherein the control device is configured to receive the signal from the sensor and at least one of store, analyze, and communicate the signal.

In another aspect, a slew drive is disclosed wherein the slew drive comprises a slew drive housing, a first distal plate comprising one or more first-holes, a second distal plate comprising one or more second-holes, a worm gear comprising a central threaded section, a first distal shaft section having a first shoulder, and a second distal shaft section having a second shoulder, a first bearing seated on the first distal shaft section and abutting the first shoulder and the first distal plate, a second bearing seated on the second distal shaft section and abutting the second shoulder and the second distal plate, a worm wheel comprising worm-wheel teeth, operative to engage the central threaded section of the worm gear, one or more first-bolts inserted through the one or more first-holes, operative to secure the worm gear and the first bearing to the slew drive housing, one or more second-bolts inserted through the one or more second-holes, operative to secure the worm gear and the second bearing to the slew drive housing, and a sensor coupled with one of, one of the one or more first-bolts and one or more second-bolts, and one of the first distal plate and the second distal plate, wherein the sensor is configured to sense a load on the one of one of the one or more first-bolts and one or more second-bolts, and one of the first distal plate and the second distal plate, in response to a torque on the worm wheel and generate a signal indicative of the torque on the worm wheel.

Preferably, the sensor is embedded in a center of the one of the one or more first-bolts and one or more second-bolts, and the first distal plate and the second distal plate.

Preferably, the slew drive further comprises a control device coupled with the sensor, wherein the control device is configured to receive the signal from the sensor and at least one of store, analyze, and communicate the signal.

Preferably, the slew drive comprises a first distal plate comprising four first-holes, a second distal plate comprising four second-holes, four first-bolts inserted through the four first-holes, four second-bolts inserted through the four second-holes, four sensors, wherein two of said four sensors are coupled with two of the four first-bolts and the other two of said four sensors are coupled with two of the four second-bolts, and a control device, coupled with the four sensors, wherein each of the four sensors is configured to sense a load on each of the two of the four first-bolts and the two of the four second-bolts in response to a torque on the worm wheel and generate a signal indicative of the torque on the worm wheel, and wherein the control device is configured to receive the signal from each of the four sensors and at least one of store, analyze, and communicate the signal.

Preferably, the control device comprises a processor, including a programming code stored on a storage device of said processor and operable on the processor, wherein the processor further comprises an analog to digital convertor (ADC), said ADC operative to digitize the signal from each of the four sensors at a sampling rate of the ADC and generate a digitized signal corresponding to each of the four sensors, and a communication module operative to at least one of receive and transmit radio waves, and wherein the processor is configured to at least one of store, analyze, and communicate at least one of the signal and the digitized signal corresponding to each of the four sensors.

Preferably, the processor is configured to construct a histogram of the digitized signal corresponding to each of the four sensors.

Preferably, the processor is configured to compute an average value of the digitized signal corresponding to each of the four sensors, indicative of an average value of the torque on the worm wheel, over a predetermined time period.

Preferably, the processor is configured to transmit the average value, via the communication module, to a motor controller.

Preferably, the processor is configured to compute a frequency spectrum of the digitized signal corresponding to each of the four sensors, indicative of time varying function of the torque on the worm wheel.

Preferably, the processor is configured to transmit the frequency spectrum, via the communication module, to a motor controller.

DETAILED DESCRIPTION OF THE PRESENTLY PREFERRED EMBODIMENTS

Figures 1A, 1B, 1C:
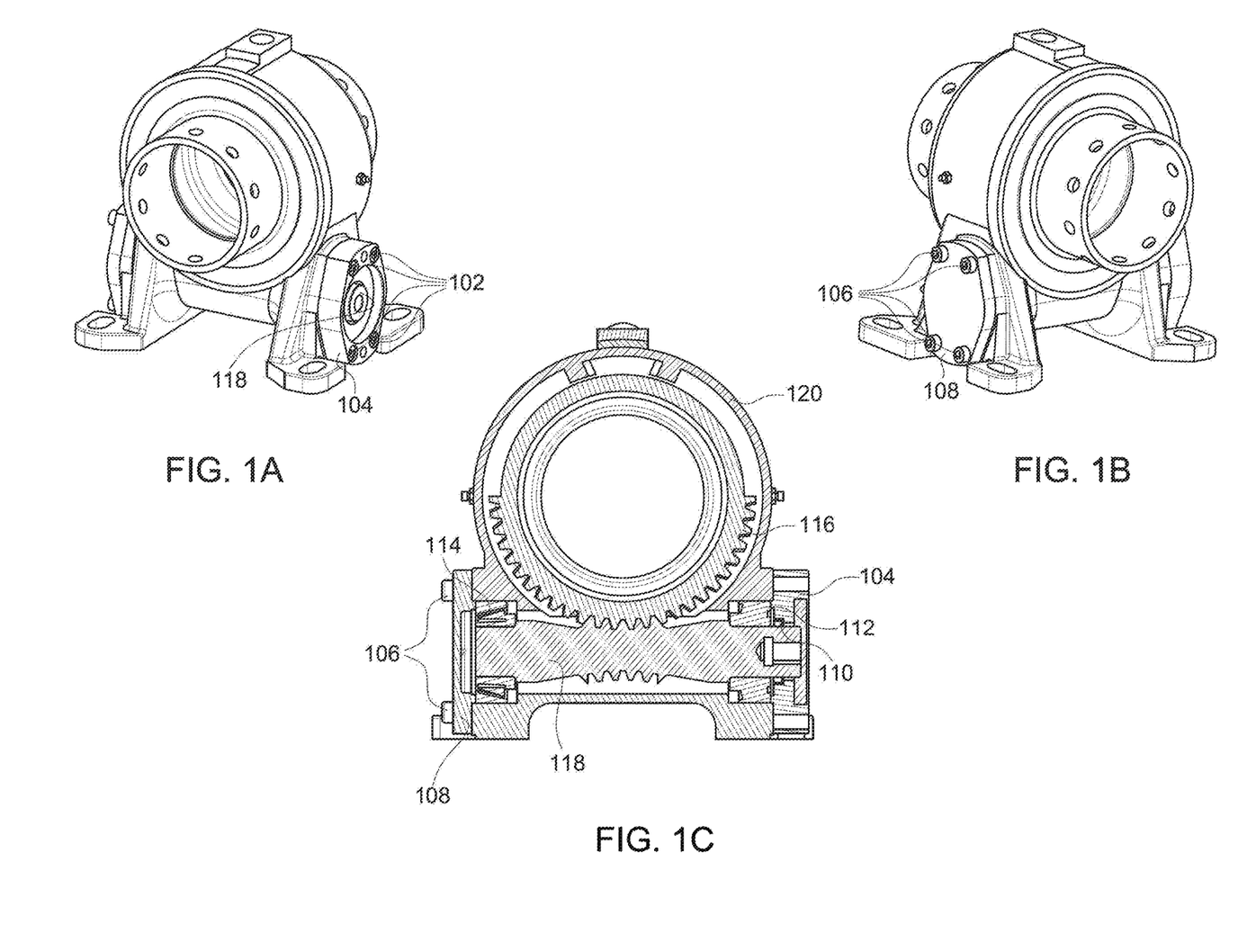
FIG. 1A shows a left perspective view of the front side of a slew drive where a first end plate is used to secure the worm gear to the housing using 4 bolts.
FIG. 1B shows a right perspective view of the front side of the slew drive where a second end plate is used to further secure the worm gear to the housing using 4 bolts.
FIG. 1C shows a front cross-sectional view of the slew drive which illustrates how the worm gear and the worm wheel are engaged.

FIGS. 1A through 1C show a slew drive in different views. In particular, FIG. 1A depicts a left perspective view of the front side of the slew drive where an end plate 104 is used to secure a worm gear 118 to the housing 120 (FIG. 1C) using 4 bolts 102. FIG. 1B depicts a right perspective view of the front side of the slew drive where another end plate 108 is used to secure the worm gear 118 to the housing 120 (FIG. 1C) using 4 bolts 106. FIG. 1C is a cross-sectional front view of the slew drive which shows how the worm gear 118 and a worm wheel 116 are engaged. Two tapered roller bearings 112 and 114 are fitted into both ends of the housing 120 and the worm gear 118 is fitted into the inner races of the bearings 112 and 114. The end plates 104 and 108 abut the housing 120 and the bearings 112 and 114. The bolts 102 (not visible in this cross-sectional view) and 106 are used to secure the worm gear in the axial direction while imparting an axial compressive force on the worm gear 118 to enhance and improve teeth engagement between the worm gear 118 and worm wheel 116. A seal 110 is disposed within the end plate 104 to prevent the lubricant from exiting the housing 120.

An objective of the present invention is to measure the torque applied on the external unit (not shown) by embedding one or more sensors in one or more of the end plates 104 and 108, and bolts 102 and 106. During operation, the torque applied on the external unit is also applied, equally but in the opposite direction (known to artisans of ordinary skill), on the worm wheel. As such, any reference to the torque applied to the external device is understood to be the torque applied to the worm wheel, equal in magnitude but opposite in direction. This torque is then transmitted to the worm gear as an axial force through the worm gear which is added, algebraically, to the tensile force within the bolts. The sensor is calibrated to a null setting at the unloaded state and the strain, in the one or more of the end plates 104 and 108, and bolts 102 and 106, due to the axial force during operation, is detected by the sensor (see FIG. 2C or FIG. 3C). A monitor/control device, hereinafter control device, (see FIG. 5) receives the signals generated by the sensors which can be stored, processed/analyzed, and/or transmitted to an external device (not shown) through wire or wireless communication.

Figure 2A:
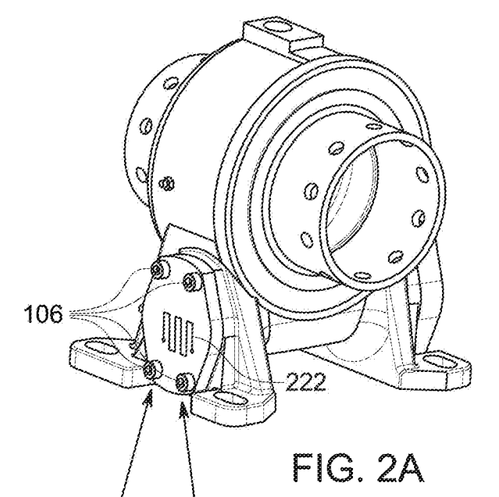
FIG. 2A shows a left perspective view of the front side of a slew drive having a first end plate with 4 bolts. One or more sensors can be coupled with the center of the first end plate or the 4 bolts to measure the torque on the worm wheel, according to a preferred embodiment.
Figure 2B:
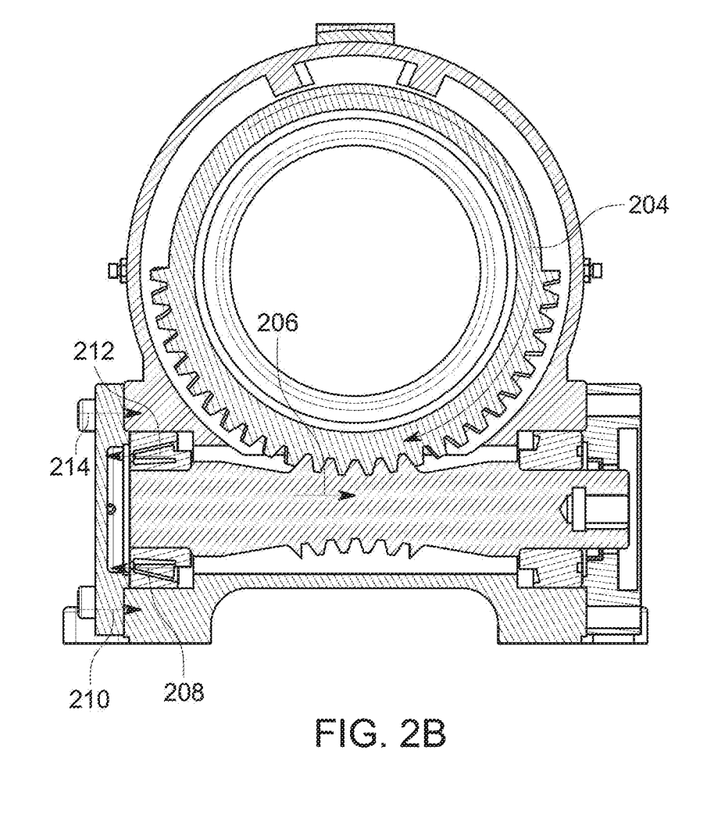
FIG. 2B shows a front cross-sectional view of the slew drive of FIG. 2A further illustrating how the first end plate, the bolts, and the bearings experience the torque applied on an external unit which is manifested as an axial force on the worm gear.

FIGS. 2A and 2B illustrate how the bolts 106 experience the torque applied on an external unit (not shown). The torque 204 on the worm wheel (FIG. 1C, 116) is manifested as an axial force 206 through the worm gear (FIG. 1C, 118) and illustrative reactive forces 208 through 214 which are further transmitted through the two tapered roller bearings (FIG. 1C, 112 and 114), the two end plates (FIG. 1C, 104 and 108), and the 8 bolts (FIG. 1C, 102 and 106).

Figure 2C:
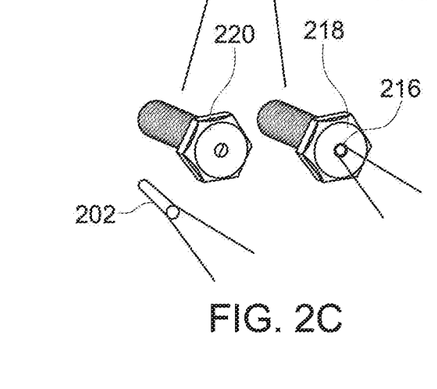
FIG. 2C shows a perspective view of two bolts from the 4 bolts, shown in FIG. 2A, which may be selected to embed two sensors, such as a strain gauge, in the center of the bolts, according to a preferred embodiment.

FIG. 2C shows two bolts 218 and 220 each maybe used to embed a sensor which, in this example, is a strain gauge 202 available from HBM, Inc. at 19 Bartlett Street, Marlborough, Mass. 01752. Optical strain gauges may also be utilized to measure the axial force experienced by the bolts 102 and 106.

According to a preferred embodiment, a hole 216 is drilled into the bolt 218 and the strain gauge 202 is inserted in the hole 216. Axial loads experienced by the bolt 218, due to the torque 204, can be measured, stored, processed/analyzed, and transmitted by wire or wireless communication via a control device (see FIG. 5).

Figure 3A:
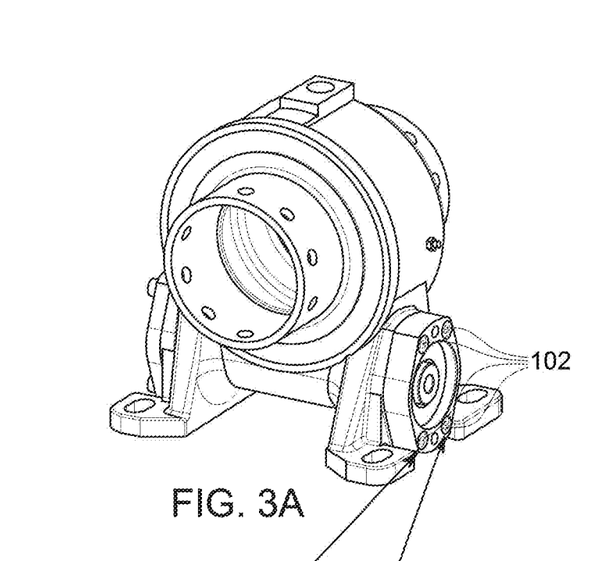
FIG. 3A shows a right perspective view of the front side of a slew drive having a second end plate with 4 bolts. One or more sensors can be coupled with the center of the second end plate or the 4 bolts to measure the torque on the worm wheel, according to a preferred embodiment.
Figure 3B:
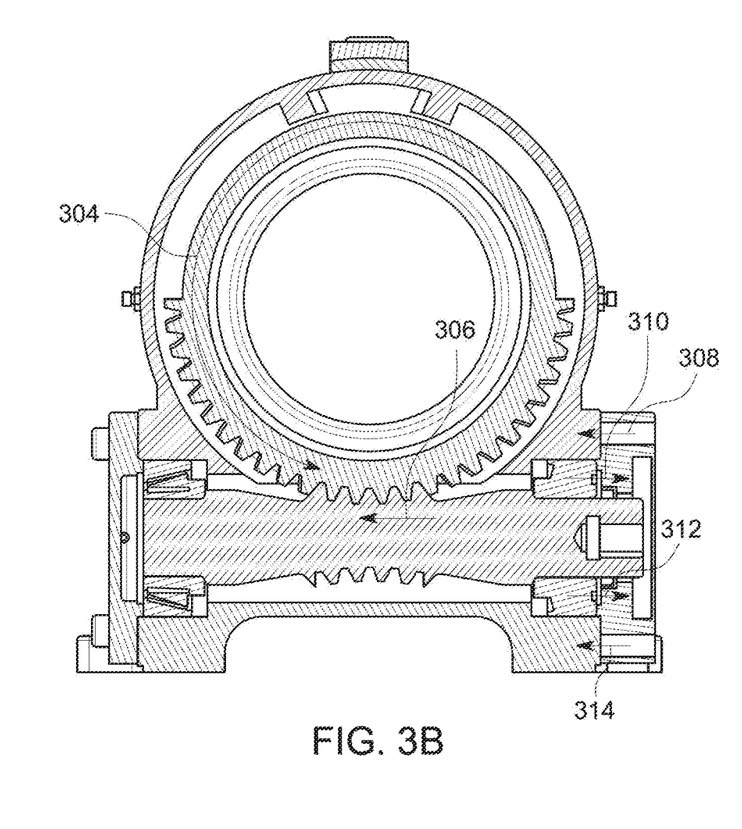
FIG. 3B shows a front cross-sectional view of the slew drive of FIG. 3A further illustrating how the second end plate, the bolts, and the bearings experience the torque applied on an external unit which is manifested as an axial force on the worm gear.

FIGS. 3A and 3B illustrate how the bolts 102 experience the torque applied on an external unit (not shown). The torque 304 on the worm wheel (FIG. 1C, 116) is manifested as an axial force 306 through the worm gear (FIG. 1C, 118) and illustrative reactive forces 308 through 314 which are further transmitted through the two tapered roller bearings (FIG. 1C, 112 and 114), the two end plates (FIG. 1C, 104 and 108), and the 8 bolts (FIG. 1C, 102 and 106).

Figure 3C:
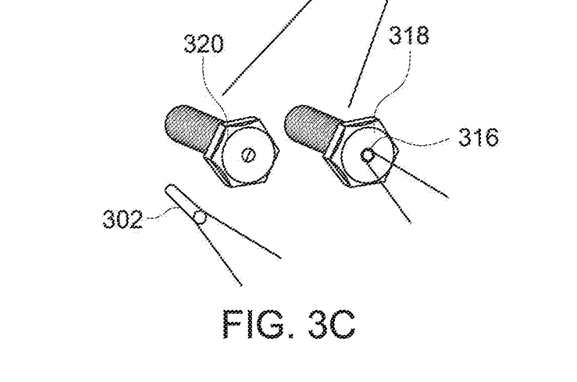
FIG. 3C shows a perspective view of two bolts from the 4 bolts, shown in FIG. 3A, which may be selected to embed two sensors, such as a strain gauge, in the center of the bolts, according to a preferred embodiment.

Similar to the above configuration, a hole 316 is drilled into the bolt 318 and the strain gauge 302 is inserted in the hole 316. Axial loads experienced by the bolt 318, due to the torque 304, can be measured, stored, processed/analyzed, and transmitted by wire or wireless communication via a control device (see FIG. 5). Although, only one strain gauge would be sufficient to measure the torque 204/304, all 8 bolts 102 and 106 can be used to embed 8 strain gauges to increase the accuracy of the measurements.

FIGS. 2B and 3B depict the applied torques 204 and 304 on the worm wheel in both directions. The applied torques 204 and 304 maybe static or dynamic, steady state or transient. The signals generated by the strain gauges 202 or 302 are electrical signals which are digitized, stored, processed/analyzed, and/or transmitted using the control device discussed below in more detail.

Figure 4:
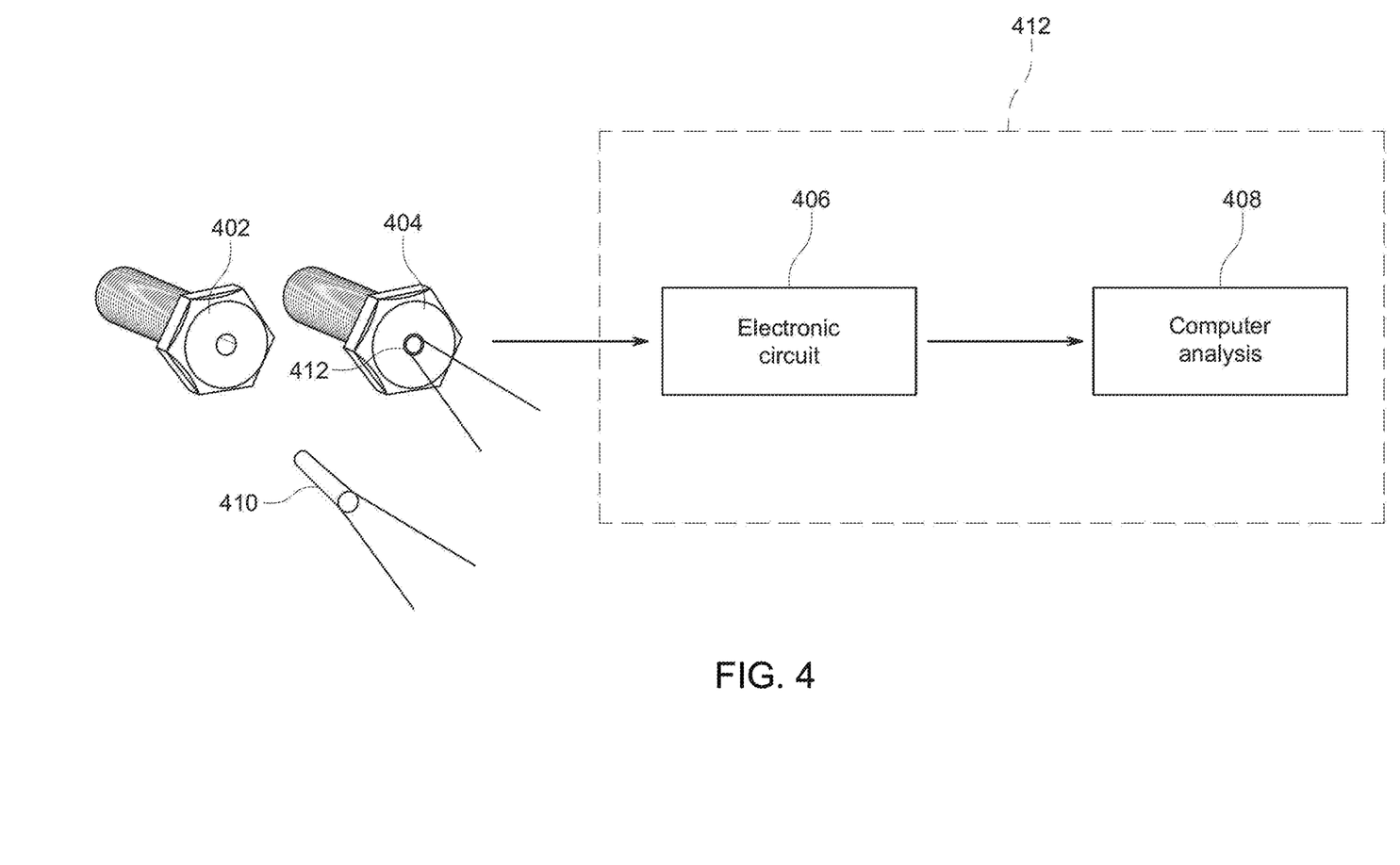
FIG. 4 shows a perspective view of two bolts and an illustrative hole drilled in the bolt to embed a sensor, according to a preferred embodiment. The applied torque on the external unit causes an axial load in the bolt and a signal is generated by the sensor. The schematic diagram in this figure shows a control device, including a processor, storage device, and an ADC, which can be used to store, analyze, and communicate the signal, according to a preferred embodiment.

FIG. 4 depicts two bolts 402 and 404 and an illustrative hole 412 drilled in the center of the bolt 404 to embed a strain gauge 410. The applied torque on the external unit causes an axial load in the bolt 404 and an electrical signal, hereinafter simply a signal, is generated by the strain gauge 410. A control device 412, comprising an electrical circuit 406, is used to monitor the strain gauge during operation of the slew drive. The control device 412 comprising a processor 408 and further including a storage device, an analog to digital convertor (ADC) and a communication module, is used to digitize, store, analyze, and communicate the result. The force in the bolt 402 due to the applied torque is converted into a torque that is being exerted upon the worm wheel and is measured, digitized, and stored at a high rate and in real time in a memory unit of the control device 412. The stored data can be used to determine the exposure of the slew drive to various torques during operation. A histogram may be obtained from the recorded torques to provide information about the operational condition of the slew drive throughout its life, including failure points and proximity to operational specification. The processor 408 may be configured to construct a histogram of the digitized signal. The processor 408 may be configured to compute an average value of the digitized signal, indicative of an average value of the torque on the worm wheel, over a predetermined time period. The processor 408 may be configured to transmit the average value, via the communication module, to a motor controller. The processor 408 may be configured to compute a frequency spectrum of the digitized signal, utilizing the Fourier Transform method (known to artisans of ordinary skill), indicative of a time varying function of the torque on the worm wheel. The processor 408 may be configured to transmit the frequency spectrum, via the communication module, to a motor controller.

Figure 5:
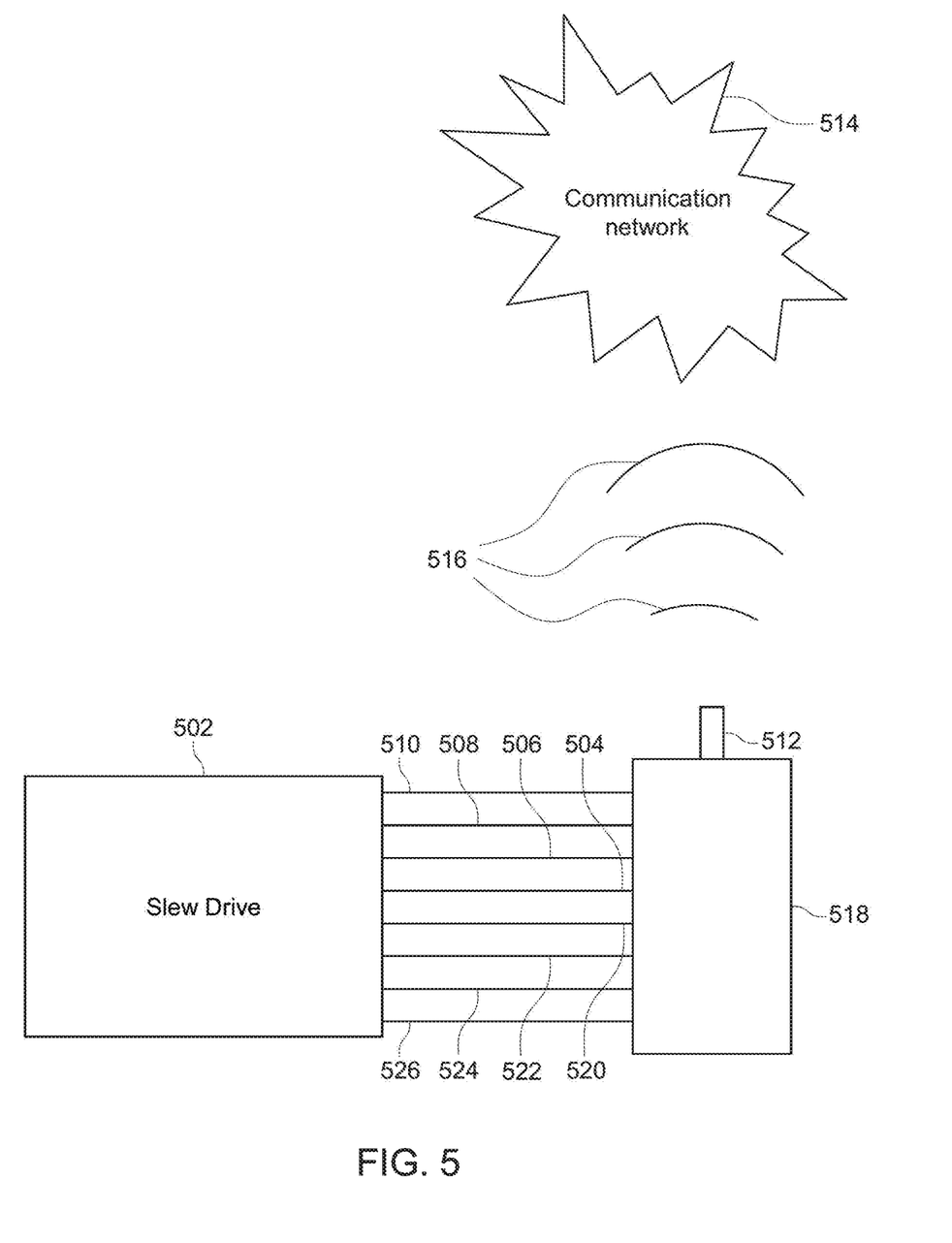
FIG. 5 shows a schematic diagram of a slew drive instrumented with 4 strain gauges whose signal lines carry strain information and are coupled with a control device, having an I/O port comprising a communication module, to store, analyze, and/or communicate the strain information from each of the 4 strain gauges, according to a preferred embodiment.

FIG. 5 depicts a schematic diagram of a slew drive 502 instrumented with 4 strain gauges whose signal lines 504, 506, 508, 510, 520, 522, 524, and 526 are coupled with a control device 518. According to a preferred embodiment, the control device 518 is a 68HC08 processor having internal flash memory available from Freescale of Austin, Tex. It is contemplated that the processor may be a combination of individual discrete or separate integrated circuits packaged in a single housing or it may be fabricated in a single integrated circuit. The control device 518 includes an analog to digital convertor which digitizes the strain gauge signal for storage and further processing including digital signal processing. The raw or processed data can be communicated through a communication port 512 via radio waves 516 which includes Bluetooth and/or WIFI to a communication network 514. The data can also be transmitted via wired communication lines (not shown). As such, the operation of the slew drive 502 may be monitored and controlled in real time.

The control device 518 is used to determine at high rate the torque in the slew drive at any time during its operation. This can be used to determine the dynamic and static condition/exposure of the drive in an application (such as to dynamic wind fluttering in a solar tracker application), the proximity of the drive to a failure point, the proximity of the drive to its absolute specification.

This torque sensing in the drive can also be used as feedback in a control loop to guide actuation of the drive to reach a desired static or dynamic outcome. For example, if the drive torque is nearing the drive ultimate capacity, the sensor can guide a motor controller to move the drive in a direction to relief torque. In another example, if a drive in a solar tracker experiences vibration from wind activation, the torque of that vibration can be used to instruct the solar tracker controller to actuate the drive in a way to relieve the dynamic wind effect/motion.

Figure 6A:
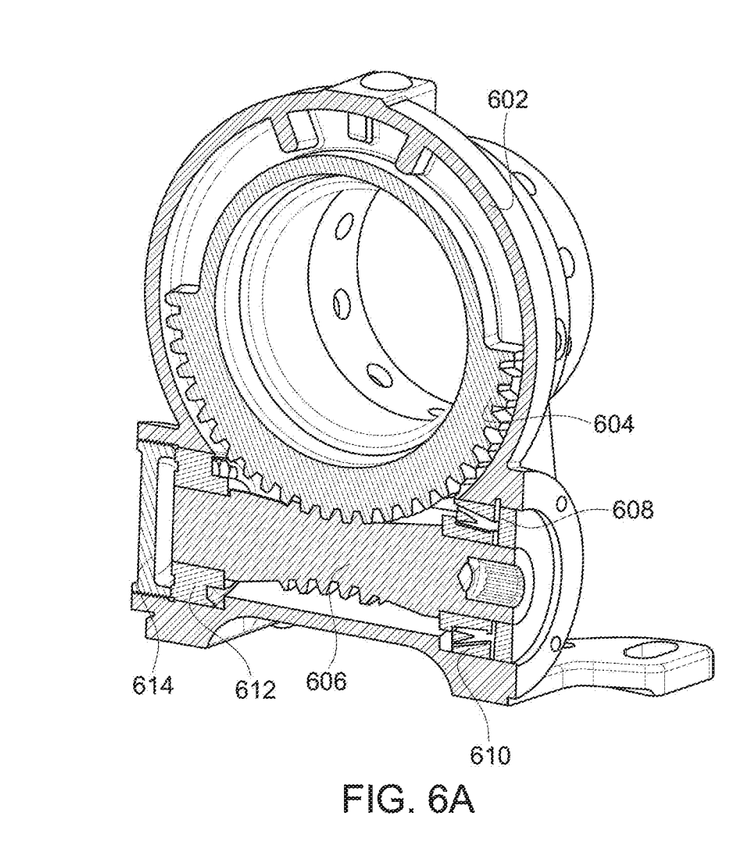
FIG. 6A shows a perspective cross-sectional view of an improved integrated slew drive which may be instrumented with one or more sensors to measure the applied torque on the worm wheel, according to a preferred embodiment.
Figure 6B:
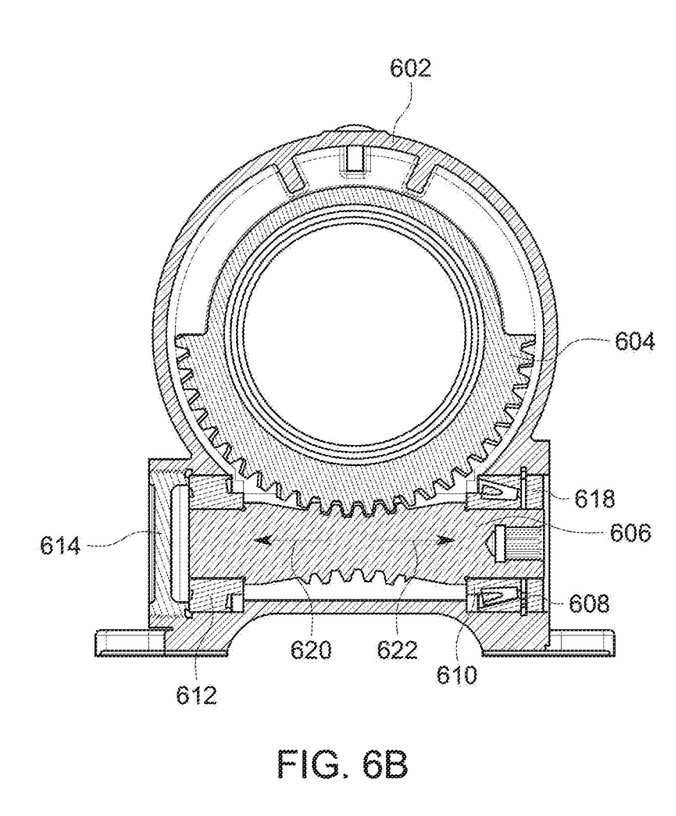
FIG. 6B shows a front cross-sectional view of the improved integrated slew drive of FIG. 6A which maybe instrumented with one or more sensors to measure the applied torque on the worm wheel which is manifested as an axial force on the worm gear, the direction of the axial force depends on the direction of the applied torque.

FIGS. 6A and 6B depict an improved integrated slew drive in different views which is also disclosed in a commonly owned pending patent application Ser. No. 16/133,375, incorporated by reference herein in its entirety. In particular, FIG. 6A depicts a perspective cross-sectional view of the slew drive. The slew drive comprises a housing 602 which comprises a first distal housing section having a threaded section. The housing 602 further includes a second distal housing section having a groove. The first distal housing section receives a threaded plug 614 that threads into the threaded section. The groove is machined into the second distal housing section to receive a retaining ring 608, such as a spring clip.

FIG. 6B depicts a front cross-sectional view of the slew drive. A worm gear 606 is secured to the slew drive housing 602 by a first tapered roller bearing 612 and a second tapered roller bearing 610. The worm gear 606 comprises a central threaded section, a first distal shaft section having a first shoulder, and a second distal shaft section having a second shoulder. The central threaded section of the worm gear 606 engages the worm-wheel teeth of a worm wheel 604. The worm gear 606 rotates around its axial axis and rotates the worm wheel 604 around its axial axis.

The first tapered roller bearing 612 is seated on the first distal shaft section, abutting the first shoulder and the plug 614, and the second tapered roller bearing 610 is seated on the second distal shaft section, abutting the second shoulder and the retaining ring 608. A seal, such as an oil, 618 is seated on the second distal shaft section, abutting the retaining ring 608 to prevent lubricant from exiting the housing 602.

As the threaded plug 614 is rotated in engagement with the threaded section of the first distal housing section of the housing 602, an axial compressive force is exerted upon the worm gear 606 through the first tapered roller bearing 612 to ensure improved engagement between the thread section of the worm gear 606 and the worm-wheel teeth of the worm wheel 604. The retaining ring 608 exerts the same magnitude compressive force on the worm gear 606 but in the opposite direction through the second tapered roller bearing 610.

FIGS. 6A and 6B illustrate how the plug 614 and retaining ring 608 experience the torque applied on an external unit (not shown). The torque on the worm wheel 604 is manifested as an axial force 620 or 622, depending on the direction of the applied torque, through the worm gear 606 which are further transmitted through the two tapered roller bearings 612 and 610, the plug 614, and the retaining ring 608.

Similar to the above configuration, a strain gauge 616 may be inserted in the center of the plug 614 or the retaining ring 608. Axial loads experienced by the plug 614 or the retaining ring 608, due to the torque, can be measured, stored, processed, and transmitted by wire or wireless communication via a control device as described above (see FIG. 5).

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A slew drive, comprising:
   (a) a slew drive housing;
   (b) a worm gear comprising a central threaded section;
   (c) a worm wheel comprising worm-wheel teeth, operative to engage the central threaded section of the worm gear;
   (d) a securing device, operative to secure the worm gear to the slew drive housing;
   (e) a sensor coupled with the securing device wherein the sensor is configured to sense a load on the securing device in response to a torque on the worm wheel and generate a signal indicative of the torque on the worm wheel; and
   (f) a control device configured to receive the signal from the sensor, and comprising a processor (1) comprising an analog to digital converter (ADC) operative to generate a corresponding digitized signal from the signal from the sensor, and (2) configured to construct a histogram of the digitized signal.

2. The slew drive of claim 1, wherein the securing device is one of a distal plate, a bolt, a threaded plug, and a retaining ring.

3. The slew drive of claim 1, wherein the sensor is one of an electrical strain gauge and an optical strain gauge.

4. The slew drive of claim 1, wherein the control device comprises a communication module operative to at least one of receive and transmit radio waves, and wherein the processor is configured to at least one of store, analyze, and communicate at least one of the signal and the digitized signal.

5. The slew drive of claim 4, wherein the processor is configured to transmit the at least one of the signal and the digitized signal, via the communication module, to a remote computer system.

6. The slew drive of claim 4, wherein the processor is configured to compute an average value of the digitized signal, indicative of an average value of the torque on the worm wheel, over a predetermined time period.

7. The slew drive of claim 6, wherein the processor is configured to transmit the average value, via the communication module, to a motor controller.

8. The slew drive of claim 4, wherein the processor is configured to compute a frequency spectrum of the digitized signal, indicative of a time varying function of the torque on the worm wheel.

9. The slew drive of claim 8, wherein the processor is configured to transmit the frequency spectrum, via the communication module, to a motor controller.

10. The slew drive of claim 4, wherein the communication module comprises at least one of a wired communication module and wireless communication module.

11. A method of monitoring and controlling a slew drive, comprising:
(a) providing a slew drive housing;
(b) providing a worm gear comprising a central threaded section;
(c) providing a worm wheel comprising worm-wheel teeth, operative to engage the central threaded section of the worm gear;
(d) providing a securing device, operative to secure the worm gear to the slew drive housing;
(e) providing a sensor coupled with the securing device; wherein the sensor is configured to sense a load on the securing device in response to a torque on the worm wheel and generate a signal indicative of the torque on the worm wheel; and
(f) providing a control device configured to receive the signal from the sensor, and comprising a processor (1) comprising an analog to digital converter (ADC) operative to generate a corresponding digitized signal from the signal from the sensor, and (2) configured to (i) construct a histogram of the digitized signal, (ii) compute an average value of the digitized signal, indicative of an average value of the torque on the worm wheel, and transmit the average value of the digitized signal to a motor controller, or (iii) compute a frequency spectrum of the digitized signal, indicative of a time varying function of the torque on the worm wheel.

12. A slew drive, comprising:
(a) a slew drive housing;
(b) a first distal plate comprising a plurality of first-holes;
(c) a second distal plate comprising a plurality of second-holes;
(d) a worm gear comprising a central threaded section, a first distal shaft section having a first shoulder, and a second distal shaft section having a second shoulder;
(e) a first bearing seated on the first distal shaft section and abutting the first shoulder and the first distal plate;
(f) a second bearing seated on the second distal shaft section and abutting the second shoulder and the second distal plate;
(g) a worm wheel comprising worm-wheel teeth, operative to engage the central threaded section of the worm gear;
(h) a plurality of first-bolts inserted through the plurality of first-holes, operative to secure the worm gear and the first bearing to the slew drive housing;
(i) a plurality of second-bolts inserted through the plurality of second-holes, operative to secure the worm gear and the second bearing to the slew drive housing; and
(j) a plurality of sensors, wherein at least one of the sensors is coupled with
(1) at least one of the plurality of first-bolts, and at least one of the sensors is coupled with at least one of the plurality of second-bolts,
wherein each sensor of the plurality of sensors is configured to sense a load on a corresponding first-bolts or second-bolts
in response to a torque on the worm wheel and generate a signal indicative of the torque on the worm wheel; and
(m) a control device coupled with the plurality of sensors and configured to receive the signal from each of the plurality of sensors and at least one of store, analyze, and communicate the signal.

13. The slew drive of claim 12 wherein the sensor is embedded in a center of the one of:
(I) the one or more first-bolts and one or more second-bolts.

14. The slew drive of claim 12, wherein the the first distal plate comprises four first-holes, and the second distal plate comprises four second-holes, the plurality of first-bolts comprises four first-bolts inserted through the four first-holes, the plurality of second-bolts comprises four second-bolts inserted through the four second-holes, four sensors, wherein two of said four sensors are coupled with two of the four first-bolts and the other two of said four sensors are coupled with two of the four second-bolts, and wherein the control device is coupled with the four sensors, wherein each of the four sensors is configured to sense a load on each of the two of the four first-bolts and the two of the four second-bolts in response to a torque on the worm wheel and generate a signal indicative of the torque on the worm wheel, and wherein the control device is configured to receive the signal from each of the four sensors and at least one of store, analyze, and communicate the signal.

15. The slew drive of claim 14, wherein the control device comprises a processor, including a programming code stored on a storage device of said processor and operable on the processor wherein the processor further comprises an analog to digital convertor (ADC), said ADC operative to digitize the signal from each of the four sensors at a sampling rate of the ADC and generate a digitized signal corresponding to each of the four sensors, and a communication module operative to at least one of receive and transmit radio waves, and wherein the processor is configured to at least one of store, analyze, and communicate at least one of the signal and the digitized signal corresponding to each of the four sensors.

16. The slew drive of claim 15, wherein the processor is configured to construct a histogram of the digitized signal corresponding to each of the four sensors.

17. The slew drive of claim 15, wherein the processor is configured to compute an average value of the digitized signal corresponding to each of the four sensors, indicative of an average value of the torque on the worm wheel, over a predetermined time period.

18. The slew drive of claim 17, wherein the processor is configured to transmit the average value, via the communication module, to a motor controller.

19. The slew drive of claim 15, wherein the processor is configured to compute a frequency spectrum of the digitized signal corresponding to each of the four sensors, indicative of time varying function of the torque on the worm wheel.

20. The slew drive of claim 19, wherein the processor is configured to transmit the frequency spectrum, via the communication module, to a motor controller.

21. A slew drive, comprising:
(a) a slew drive housing;
(b) a worm gear comprising a central threaded section;
(c) a worm wheel comprising worm-wheel teeth, operative to engage the central threaded section of the worm gear;
(d) a securing device, operative to secure the worm gear to the slew drive housing;
(e) a sensor coupled with the securing device wherein the sensor is configured to sense a load on the securing device in response to a torque on the worm wheel and generate a signal indicative of the torque on the worm wheel; and
(f) a control device configured to receive the signal from the sensor, and comprising a processor (1) comprising an analog to digital converter (ADC) operative to generate a corresponding digitized signal from the signal from the sensor, and (2) configured to compute an average value of the digitized signal, indicative of an average value of the torque on the worm wheel, and transmit the average value of the digitized signal to a motor controller.

22. A slew drive, comprising:
(a) a slew drive housing;
(b) a worm gear comprising a central threaded section;
(c) a worm wheel comprising worm-wheel teeth, operative to engage the central threaded section of the worm gear;
(d) a securing device, operative to secure the worm gear to the slew drive housing;
(e) a sensor coupled with the securing device wherein the sensor is configured to sense a load on the securing device in response to a torque on the worm wheel and generate a signal indicative of the torque on the worm wheel; and
(f) a control device configured to receive the signal from the sensor, and comprising a processor (1) comprising an analog to digital converter (ADC) operative to generate a corresponding digitized signal from the signal from the sensor, and (2) configured to compute a frequency spectrum of the digitized signal, indicative of a time varying function of the torque on the worm wheel.

* * * * *